(12) United States Patent
Bao et al.

(10) Patent No.: US 9,383,912 B2
(45) Date of Patent: Jul. 5, 2016

(54) DATA PASTING METHOD AND APPARATUS

(71) Applicant: International Business Machines Corporation, Armonk, NY (US)

(72) Inventors: Sheng Hua Bao, Beijing (CN); Jian Chen, Beijing (CN); Zhong Su, Beijing (CN); Xin Ying Yang, Beijing (CN); Xiang Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 458 days.

(21) Appl. No.: 13/869,130

(22) Filed: Apr. 24, 2013

(65) Prior Publication Data

US 2013/0290889 A1 Oct. 31, 2013

(30) Foreign Application Priority Data

Apr. 28, 2012 (CN) .......................... 2012 1 0132783

(51) Int. Cl.
G06F 3/0486 (2013.01)
G06F 17/24 (2006.01)
G06F 17/21 (2006.01)

(52) U.S. Cl.
CPC ............ *G06F 3/0486* (2013.01); *G06F 17/211* (2013.01); *G06F 17/24* (2013.01)

(58) Field of Classification Search
None
See application file for complete search history.

(56) References Cited

U.S. PATENT DOCUMENTS

| | | | | |
|---|---|---|---|---|
| 7,293,242 B2 * | 11/2007 | Cossey | .................... | G06F 9/543 715/724 |
| 7,503,012 B2 | 3/2009 | Chen et al. | | |
| 2003/0070143 A1 | 4/2003 | Maslov | | |
| 2007/0035745 A1 * | 2/2007 | Izumi et al. | .................... | 358/1.1 |
| 2007/0226713 A1 * | 9/2007 | McGowan et al. | ........... | 717/147 |
| 2007/0271296 A1 * | 11/2007 | Purang et al. | .............. | 707/104.1 |
| 2009/0044140 A1 | 2/2009 | Chen et al. | | |

FOREIGN PATENT DOCUMENTS

| | | |
|---|---|---|
| CN | 101694650 A | 4/2010 |
| CN | 102411475 A | 4/2012 |

OTHER PUBLICATIONS

PCT International Search Report and Written Opinion; International Application No. PCT/CN2013/074070; International Filing Date: Apr. 11, 2013; Date of Mailing: Jul. 18, 2013; pp. 1-11.
Billore, et al., "System, Apparatus and Provision to Transfer Content From an Application to Another Application or File, With Preview and Preferences".

* cited by examiner

*Primary Examiner* — Andrea Leggett
*Assistant Examiner* — Mahelet Shiberou
(74) *Attorney, Agent, or Firm* — Cantor Colburn LLP; David Quinn

(57) ABSTRACT

A data pasting method and apparatus. The method determines attributes of a source object that is data to be pasted. The attributes of each candidate paste target is obtained among a plurality of candidate paste targets, the attributes of the candidate paste targets contrain an editable component which determines a matching relationship between each of the candidate paste targets and the source object based on the attributes of the source object and the attributes of the editable component. The method provides recommendation for pasting the source object based on the matching relationship. By adopting the technical solution according to the present application, the efficiency of data pasting operation can be improved. Also provided is an apparatus for implementing the above data pasting method.

15 Claims, 6 Drawing Sheets

DATA PASTING METHOD AND APPARATUS

CROSS-REFERENCE TO RELATED APPLICATION

This application claims priority under 35 U.S.C. §119 from Chinese Patent Application No. 201210132783.X filed Apr. 28, 2012, the entire contents of which are incorporated herein by reference.

BACKGROUND OF THE INVENTION

1. Field of the Invention

The present invention relates to a technical solution of data pasting, and more specifically, to a simpler method and apparatus for data pasting.

2. Description of the Related Art

In daily work and life, it is frequently required to clip/copy and paste data.

A typical scenario is that a user first has to copy or clip an object to be pasted in a source document and then switches to a specific target application that requires pasting data, and further browse to a specific location to perform the paste operation. It can be seen that when adopting the prior art, the user has to perform a plurality of operations until locating the specific paste location. After the user knows the specific paste target, he/she still has to take time to find the object to be pasted in the case of too many candidate targets. Particularly, during a process of frequently copying and pasting data, the copying and pasting efficiency will be seriously dampened.

Also, more and more people perform entertaining or routine work on a mobile device. Due to the restriction of screen size of the mobile device and poor operability, it is even harder to quickly find the candidate paste object, which further aggravates the seriousness of this problem.

Thus, the prior art still has room to improve and it is desirable to provide a more convenient method and apparatus for data pasting.

SUMMARY OF THE INVENTION

One aspect of the present invention, is a data pasting method, which determines attributes of a source object data to be pasted; obtaining attributes of each candidate paste target among a plurality of candidate paste targets, the attributes of the candidate paste targets at least including attributes of an editable component; determining a matching relationship between each of the candidate paste targets and the source object based on the attributes of the source object and the attributes of the editable component; and providing a recommendation for pasting the source object based on the matching relationship.

Another aspect of the present invention, provides a data pasting apparatus, including: a first attribute determining module configured to determine attributes of a source object data to be pasted; a second attribute determining module configured to obtain attributes of each candidate paste target among a plurality of candidate paste targets, the attributes of the candidate paste targets at least including attributes of an editable component; a matching relationship determining module configured to determine a matching relationship between each of the candidate paste target and the source object based on the attributes of the source object and the attributes of the editable component; and a recommendation module configured to provide recommendation for pasting the source object based on the matching relationship.

BRIEF DESCRIPTION OF THE DRAWINGS

Features, advantages, and other aspects of various embodiments of the present invention will become more apparent from the following detailed description, when taken in conjunction with the figures illustrate several embodiments of the present invention in an exemplary rather than limiting manner.

DETAILED DESCRIPTION OF THE PREFERRED EMBODIMENT

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the complete understanding of the present disclosure, and completely conveying the scope of the present disclosure to those skilled in the art.

Figure 1:
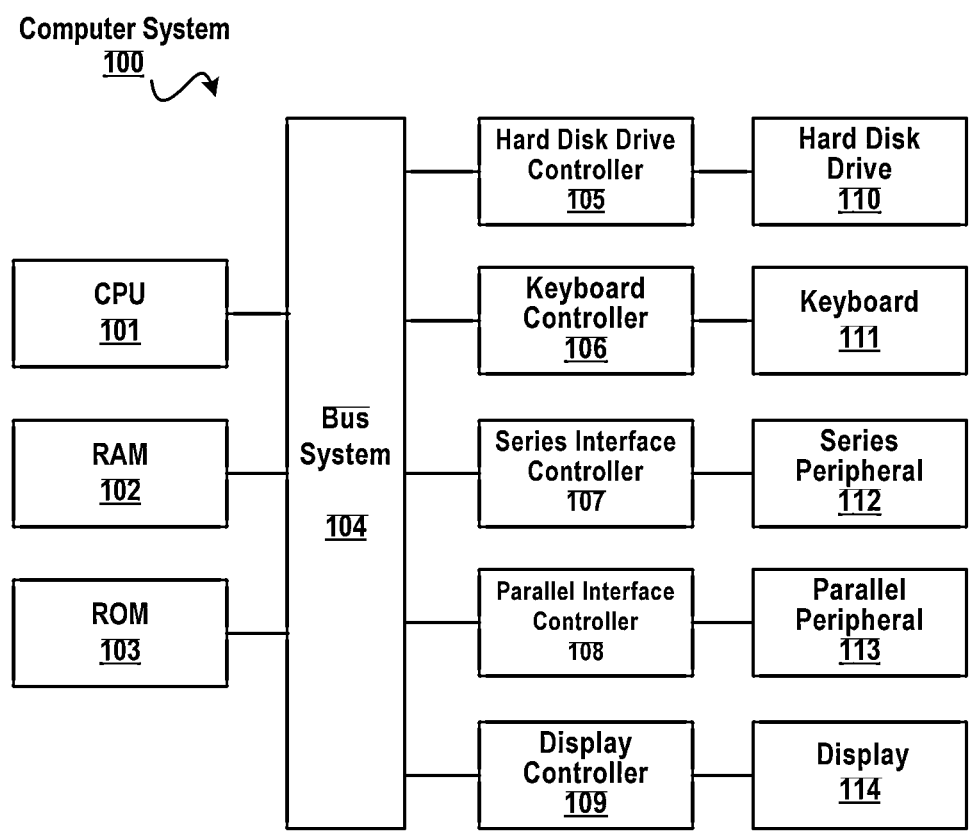
FIG. 1 shows an exemplary computer system 100 which is applicable to implement the an embodiment of the present invention.

Referring to FIG. 1 whichs shows an exemplary computer system 100 which is applicable to implement the embodiments of the present invention. As shown in FIG. 1, computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113, and Display 114. Among above devices, CPU 101, RAM 102, ROM 103, Hard Drive Controller 105, Keyboard Controller 106, Serial Interface Controller 107, Parallel Interface Controller 108, and Display Controller 109 are coupled to System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from computer system 100 based on specific situations.

As will be appreciated by one skilled in the art, aspects of the present invention can be embodied as a system, method, or computer program product. Accordingly, aspects of the present invention can take the form entirely as a hardware embodiment, a software embodiment (including firmware, resident software, micro-code, etc.) or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination thereof. A non-exhaustive list of more specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this document, a computer readable storage medium can be any tangible medium that contains or stores a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++, or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN), a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
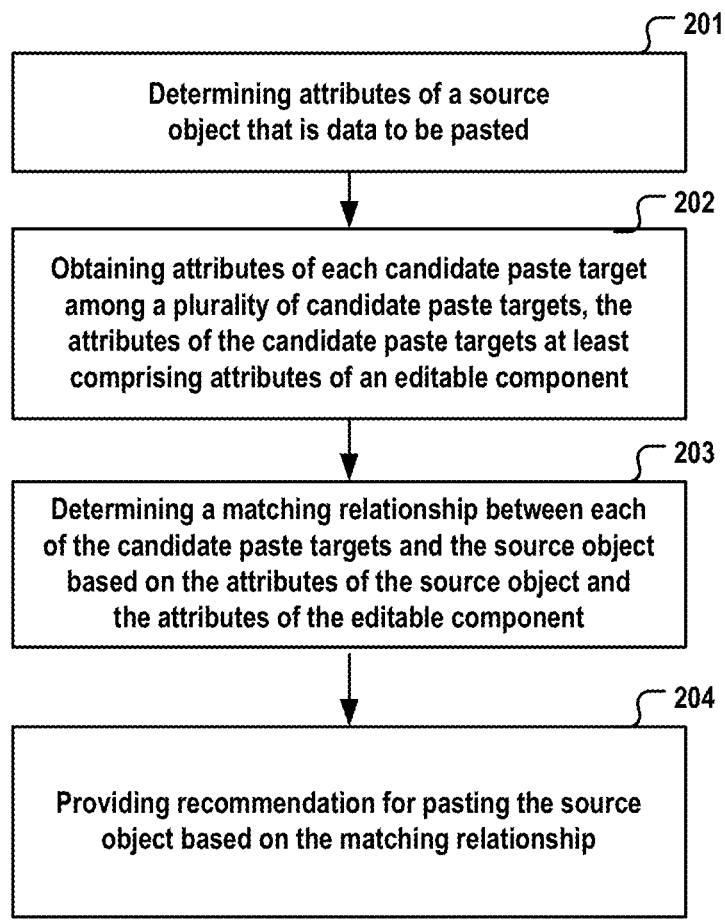
FIG. 2 shows a flowchart of a data pasting method in one embodiment of the present invention.

With reference now to FIG. 2, FIG. 2 illustrates a data pasting method, the method includes:

In step 201, attributes of a source object are determined, the source object being data, to be pasted.

A source object refers to various kinds of multimedia data to be pasted, including but not limited to data types such as text, picture, table, file, etc. A source object can be retrieved in a plurality of manners, for example, retrieved through common copying or clipping, or can be one or more source objects dragged into a clipboard, which will not be enumerated here.

The attributes of a source object can be partitioned into different sizes of granularities. Characteristics inherent to a source object, for example, type attributes such as text, picture, table, file, etc., can be regarded as coarse-granularity attributes. Each type can further include a plurality of fine-granularity attributes: for a text, length, font, color, literal content (key words) etc. can be regarded as fine-granularity attributes; for a picture, size and resolution etc. can be regarded as fine-granularity attributes; for a table, number of columns, number of rows, content type (picture, text), and literal content (key words) etc. can be regarded as fine-granularity attributes; and for a file, the specific type of the file (.mp3, .avi, .jpg, .png, .doc, etc.) can be regarded as fine-granularity attributes.

Besides, a plurality of source objects can have at least one kind of overall attribute, for example, the ordering sequence of the plurality of source objects, which is a relatively important attribute in batch copying, particularly in the scenario in which a candidate paste target includes an editable component (list, table, etc.) having a plurality of sub-elements.

The determined attributes of the source object can be represented by any structural markup language, for example, markup languages like XML, HTML, etc., and those skilled in the art would contemplate a plurality of alternative manners, as long as they can describe the attributes of the source object in a predefined data format.

In an illustrative example, there are 4 source objects in the clipboard, and the attributes of these objects are represented in the XML language as follows:

<type:text, length:20, keywords:university+stanford>// this field describes the attributes such as the type, length, and key word of the source object//

<type:pic, size:2 k, resolution:200*150>//this field describes the attributes such as the type, size, resolution of the source object//

<type:table, row:3, column:2, content-type:text, keywords: student+professor>//this field describes the attributes such as the type, number of rows, number of columns, and key words of the source object//
<type:file, ext:MP3>//this field describes the attributes such as the type and extension name of the source object//

In step 202, the attributes of each candidate paste target among a plurality of candidate paste targets are obtained, the attributes of the candidate paste targets at least including attributes of the editable component. Steps 201 and 202 can be performed with their order swapped or simultaneously.

A candidate paste target refers to the location where a source object is to be pasted. A plurality of candidate paste targets can be determined in a plurality of manners. For example, all applications, or running applications, or applications which have been used for predetermined times can be regarded as candidate paste targets. Being subjected to the paste operation, each candidate paste target at least includes one editable component.

An editable component is a component with a region available for inputting in a candidate paste target, for example, various types of editable regions available for inputting various kinds of multimedia contents such as text, picture, document object, audio, video, etc., including but not limited to an input field, a text field, a table, a rich editor, etc. With a webpage type of candidate paste target as an example, an editable interface component is a standard editable webpage interface element, for example, an input field, an input region, a rich editor embedded in the webpage, etc.

Similar to the attributes of a source object, an editable component can also have a plurality of attributes. It can not only include coarse-granularity attributes such as the type of the editable component but also include various fine-granularity attributes of the editable component, for example, length of the input field, a predetermined font, etc. Besides, the context_text of the editable component is also an attribute, which can be represented by a keyword as extracted by performing text analysis on a context text of the editable component or a tag text on an adjacent uneditable component, and the extraction of context keywords can be implemented by applying many existing text analyzing techniques.

Figure 3:
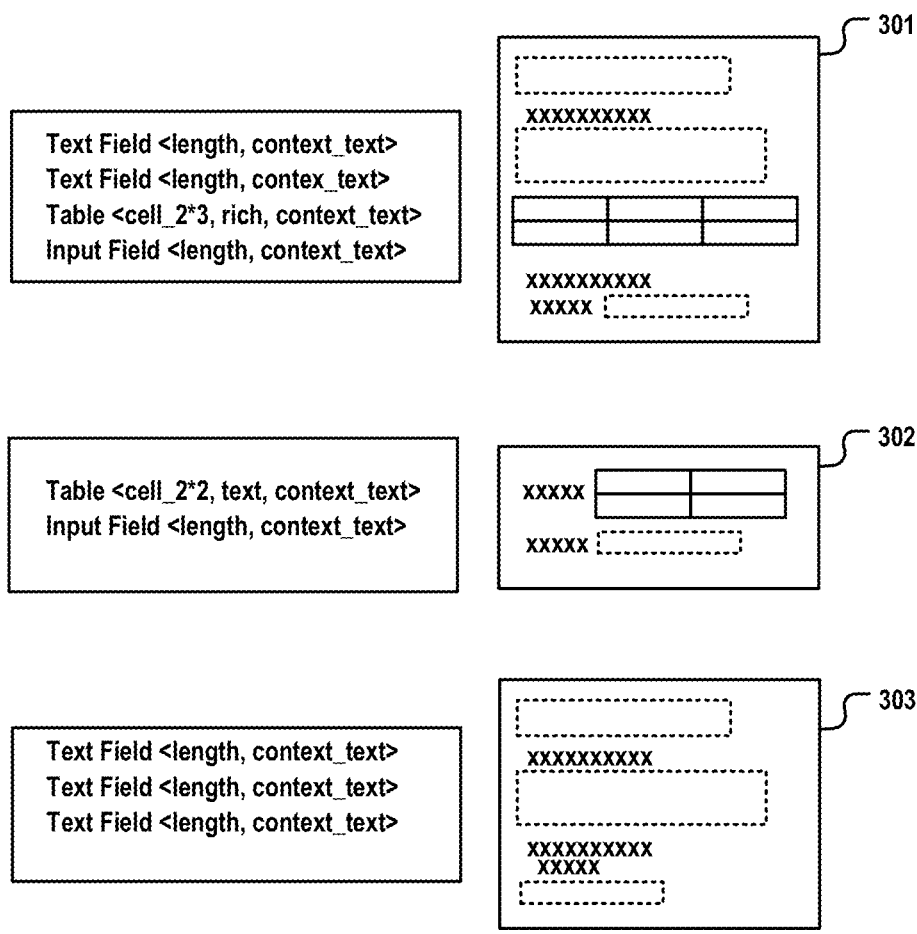
FIG. 3 shows some common editable components and attributes thereof in one embodiment of the present invention.

With reference to FIG. 3, FIG. 3 illustrates some common editable components and the attributes thereof. In this figure, 301, 302, and 303 are three candidate paste targets, with each candidate paste target including at least one editable component. The right side illustrates the attributes of the editable components included in each candidate paste target, wherein the specific attributes include the length attribute and context_text attribute of the text.

The attributes of a candidate paste target can be determined in an offline or online or a combination manner of the both. The various attributes of a candidate paste target as determined offline can be stored as redundant data and just be read out directly as required. In an embodiment of using the two manners in combination, for some candidate paste targets whose attributes cannot be determined offline, their attributes have to be determined online, for example, a recently opened webpage, or a recently installed application.

A candidate paste target can directly include an interface with an editable component, for example, a social networking website client, a twitter client, etc., and for this kind of candidate paste target, the attributes of the paste target can be determined just by analyzing the attributes of the editable component in the interface. Candidate paste targets can also be hierarchical. In one embodiment, at least one of a plurality of candidate paste targets is a high-level candidate paste target that includes a lower-level candidate paste target, while the editable component is located in the lower-level candidate paste target. For example, some applications have a concept of document, for example, email client programs, Word, and browsers can be regarded as high-level candidate paste targets, while the documents included therein are regarded as lower-level candidate paste targets. Likewise, a plurality of pages can be further comprised within the same document. Thus, each page can also be regarded as a lower-level candidate paste target with respect to the document.

The attributes of an editable component can also be represented by the XML language. For example, for a hierarchical candidate paste target, the attributes of the candidate paste target as determined are illustrated below:

```
<app id=1 >
    <doc id=1 >

<component obj=text length=100 context_text=university+CA/>
    <component obj=text length=200 context_text=description/>
    <component obj=table cell=3*2 rich=no context_text=name+list/>
    <component obj=text length=20 context_text=date/>

<component obj=table cell=2*2 rich=yes context_text=books/>
    <component obj=text length=20 context_text=publisher/>

<component obj=text length=50 context_text=singer/>
    <component obj=text length=2000 context_text=lyric/>
        <component obj=text length=100 context_text=comment/>

</doc>
    <doc id=2 >
    ...
    </doc>
</app>
```

In this illustrative example, app1 as a high-level candidate paste target includes lower-level candidate paste targets doc1 and doc2. Relatively speaking, if doc1 is taken as the high-level candidate paste target, then the lower-level candidate paste targets included therein are page1, page2, and page3.

In step 203, a matching relationship between each candidate paste target and the source object is determined based on the attributes of the source object and the attributes of the editable component. The matching relationship in this step can be determined by adopting a plurality of embodiments.

In one embodiment, the attributes of the source object are used as components to construct a first vector, and the attributes of the editable component are used as components to construct a second vector; and then the matching relationship is determined based on the similarity or distance between the first vector and the second vector by for example, adopting cosine similarity or Euclidean distance.

Each vector includes a plurality of components, and each component can be granted the same weight. However, in order to determine a more accurate matching relationship, each component can be granted different weights. The difference in weights can indicate the difference of the influence from each specific attribute component on the matching relationship. For example, the length attribute component of a text generally has a greater influence on the matching relationship than the color attribute component of the text and thus should be granted a greater weight. A weight can be designated empirically. In an improved embodiment, the weight for each component can also be determined by machine learning based on the above feature vectors. A traditional machine learning approach, for example, includes an adjacent algorithm (k-nearest neighbor), a Naïve Bayes algorithm, and a support vector machine (SVM), etc. Those skilled in the art would appreciate how to use these machine learning approaches to determine weights, which thus will not be detailed here.

In another embodiment, for each candidate paste target, the number of matching between the attributes of the editable component and the attributes of the source object is counted, and then the matching relationship is determined based on the matching number. For example, if 4 attributes among 6 attributes of the editable component of a candidate paste target match corresponding attributes of the source object, then the matching relationship can be represented by the number of 4 or the matching ratio of 4/6.

In an improved embodiment, some candidate paste targets can be directly filtered out based on mismatch of some key attributes, and then for the remaining targets to be pasted, their matching relationships with the source object can be determined as above mentioned. For example, a type attribute can be regarded as a key attribute. When the type of a source object is picture, while the type attribute of the editable component in a target to be pasted is text, it is apparent that the two do not match, and then the paste target can be directly filtered out. Those skilled in the art can define which attributes are key attributes as required or empirically, which will not be enumerated here.

Likewise, a markup language can be adopted to indicate the matching relationship. An exemplary illustration is provided below, wherein a match property is indicated by "?," while specific instances are not given. In this embodiment, a match property for indicating the matching relationship is a specific numerical value.

```
<app id=1 match_property=?>
    <doc id=1 match_property=?>

<component obj=text length=100 context_text=university+CA/>
        <component obj=text length=200 context_text=description/>
        <component obj=table cell=3*2 rich=no context_text=name+list/>
        <component obj=text length=20 context_text=date/>

<component obj=table cell=2*2 rich=yes context_text=books/>
        <component obj=text length=20 context_text=publisher/>

<component obj=text length=50 context_text=singer/>
        <component obj=text length=2000 context_text=lyric/>
            <component obj=text length=100 context_text=comment/>

</doc>
    <doc id=2 match_property=?>
    ...
    </doc>
</app>
```

Specifically, the match property for a high-level candidate paste target (doc 1) to which lower-level candidate paste targets belong can be determined based on the match properties of the lower-level candidate paste targets (page1, page2, page3). Relatively, the match property for a high-level candidate paste target (app 1) to which lower-level candidate paste targets belong can be further determined based on the match properties of the lower-level candidate paste targets (doc 1, doc 2). Thus, for a hierarchical candidate paste target, the steps of determining a matching relationship include: for lower-level candidate paste targets, determining a matching relationship between attributes of a source object and attributes of an editable component; and then determining the matching relationship of the high-level candidate paste target based on the matching relationship of the lower-level candidate paste targets.

For a candidate paste target without a hierarchy, the matching relationship of the entire candidate target can be obtained through analyzing the attributes of the editable component included therein. For example,

```
<app id=2 match_property=?>
    <component obj=text length=100 context_text=register/>
    <component obj=table cell=3*2 rich=no context_text=null/>
    <component obj=text length=50 context_text=name/>
</app>
```

At step 204, recommendation is provided for pasting the source object based on the matching relationship. Different recommendation approaches can be adopted based on the difference in the determined matching relationships in step 203.

Figure 4:
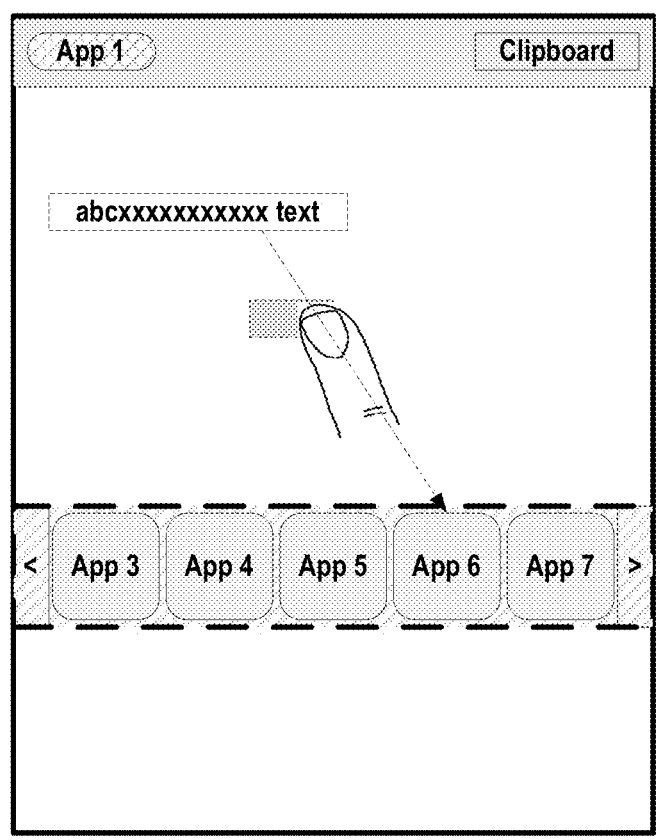
FIG. 4 shows a diagram of a recommendation window in one embodiment of the present invention.

In one embodiment, ordering can be performed on the candidate paste targets based on the matching relationship, and then one or more that rank high are recommended in a visualization window. The visualization window can be a task bar or a recommendation window diagram as shown in FIG. 4. The recommendation window is a window directly started in the application where the source object is located; thus, the candidate paste target can be quickly found without switching out from the program where the source object is located. Apparently, it can improve the facilitation of operations.

In another embodiment, some candidate targets mismatching key attributes can be filtered out, and only the remaining candidate targets are visually rendered to a user; or, the remaining candidate targets are ordered based on the matching relationship before being recommended to the user.

Figure 5:
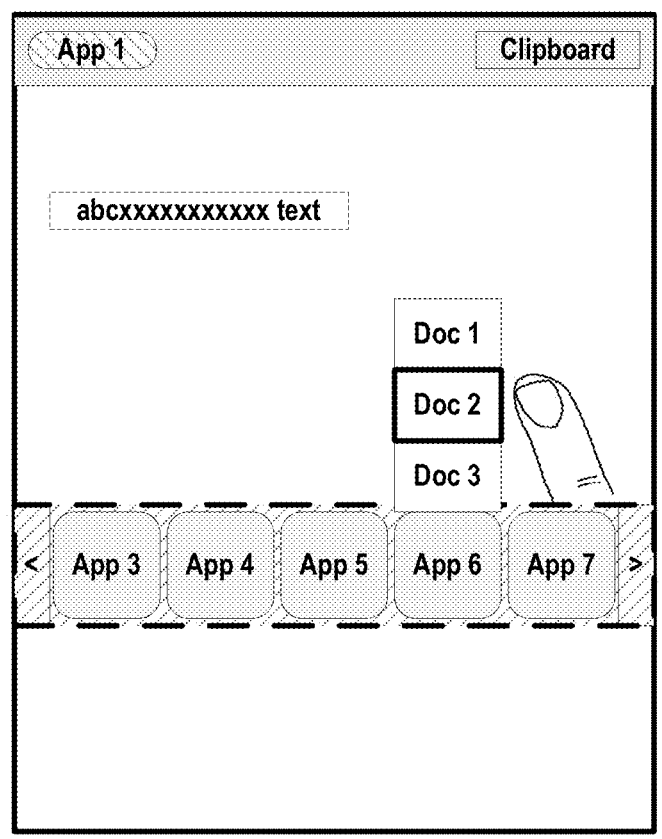
FIG. 5 shows a specific embodiment of hierarchical matching.

In an embodiment of a high-level candidate paste target including lower-level candidate paste targets, performing paste recommendation based on the matching relationship further includes: in response to selecting the high-level candidate paste targets by a user, performing recommendation based on the matching relationship of the lower-level paste targets as included therein. With reference to FIG. 5, the hierarchical match is illustrated according to a specific embodiment. It is assumed that 7 candidate paste targets applications (app id=1, 2, 3, 4, 5, 6, 7) are recommended and ordered based on the matching relationship. When the user selects <app id=6>, based on the magnitude of the match property, the lower-level candidate paste targets are ordered to be <doc id=1>><doc id=2>, and documents 1 and 2 are recommended as target programs based on the above order. When the user selects <doc id=2>, based on the magnitude of the match property,  can be further taken as the most possible target region (not shown in the figure) to be recommended to the user; after the user's selection, the page can be quickly opened and located to perform pasting.

As an improved embodiment, some additional attributes of a program to be pasted can be considered to perform auxiliary adjustment to the matching relationship so as to enhance the accuracy of the matching relationship. In one embodiment, the attributes of a target to be pasted not only include the attributes of an editable component but also include an overall attribute of the target to be pasted such that the matching relationship can be adjusted based on the overall attribute. The overall attribute can be the running state of a candidate paste target. For example, the running state can be divided into "running" and "not started" and different weighting mechanisms can be adopted. Considering the time cost and memory occupation for starting "an un-started target program," the "running target programs" can be preferentially selected for recommendation through adjusting the matching relationship. The overall attribute can also be the time elapsed from the preceding modification, and the candidate paste target with the shortest time elapsed from the preceding modification is preferentially selected for recommendation through adjusting the matching relationship. Those skilled in the art would readily contemplate other types of overall attributes, which will not be enumerated here.

In a specific embodiment, different recommendation lists can be triggered through different hand gestures. For example, rightward dragging triggers the "running program" recommendation list, and leftward dragging triggers the "not-running program" recommendation list. Other hand gestures can also be adopted to trigger a mixed recommendation list.

Figure 6:
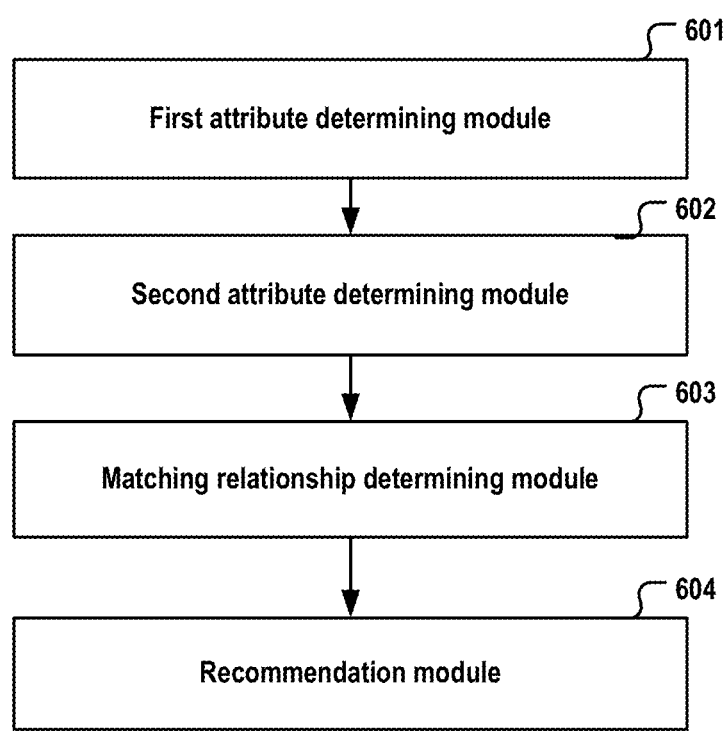
FIG. 6 shows a flowchart of a data pasting apparatus in one embodiment of the present invention.

FIG. 6 illustrates a data pasting apparatus, includes:

A first attribute determining module 601 configured to determine attributes of a source object that is data to be pasted.

A second attribute determining module 602 configured to obtain attributes of each candidate paste target among a plurality of candidate paste targets, the attributes of the candidate paste targets at least including attributes of an editable component.

A matching relationship determining module 603 configured to determine a matching relationship between each of the candidate paste targets and the source object based on the attributes of the source object and the attributes of the editable component.

A recommendation module 604 configured to provide recommendation for pasting the source object based on the matching relationship.

In one embodiment, the matching relationship determining module 603 comprises: a module configured to determine a first vector based on the attributes of the source object, to determine a second vector based on the attributes of the editable component, and to determine the matching relationship based on the similarity or the distance between the first vector and the second vector.

In another embodiment, the matching relationship determining module 603 comprises: a module configured to make statistics on the number of matching between the attributes of the editable component and the attributes of the source object, and to determine the matching relationship based on the number of the matching.

In one embodiment, at least one of the plurality of candidate paste targets is a high-level candidate paste target including lower-level candidate paste targets, and the editable component is located in the lower-level candidate paste targets. In this embodiment, the matching relationship determining module 603 includes: a module configured to determine the matching relationship between each of the lower-level candidate paste targets and the source object based on the attributes of the source object and the attributes of the editable component; and a module configured to determine the matching relationship between the high-level candidate paste target and the source object based on the matching relationship between the lower-level candidate paste targets and the source object. In this embodiment, recommendation module 604 includes: a module configured to, in response to a user's selection of the high-level candidate paste target, provide the recommendation based on the matching relationships of the lower-level paste targets included therein.

In another embodiment, a plurality of the source objects are obtained through a clipboard, and the order of the plurality of source objects is adjustable.

In one improved embodiment, the attributes of a candidate paste target further include an overall attribute of the candidate paste target, and further include a module configured to adjust the matching relationship between the candidate paste target and the source object based on the overall attribute.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
   determining attributes of a source object that is data to be pasted;
   obtaining attributes of each candidate paste target among a plurality of candidate paste targets, the attributes of the candidate paste targets at least containing attributes of an editable component;
   determining a matching relationship between each of the candidate paste targets and the source object based on the attributes of the source object and the attributes of the editable component, wherein the matching relationship comprises a hierarchy having a higher-level candidate paste target and a lower-level candidate paste target; and
   providing recommendation for pasting the source object based on the matching relationship,
   wherein determining the matching relationship between each of the candidate paste targets and the source object based on the attributes of the source object and the attributes of the editable component further comprises:
      determining a first vector based on the attributes of the source object, determining a second vector based on the attributes of the editable component, and determining the matching relationship based on at least one of a similarity between the first vector and the second vector and a distance between the first vector and the second vector, wherein the similarity is determined using cosine similarity and wherein the distance is determined using a Euclidean distance.

2. The computer-implemented method according to claim 1, wherein determining the matching relationship between each of the candidate paste targets and the source object based on the attributes of the source object and the attributes of the editable component further comprises:

making statistics on a number of matching between the attributes of the editable component and the attributes of the source object, and determining the matching relationship based on the number of the matching.

3. The computer-implemented method according to claim 1, wherein some candidate paste targets are filtered out before determining the matching relationship.

4. The computer-implemented method according to claim 1, wherein at least one of the plurality of candidate paste targets is a high-level candidate paste target comprising lower-level candidate paste targets, and the editable component is located in the lower-level candidate paste targets.

5. The computer-implemented method according to claim 4, wherein determining the matching relationship between each of the candidate paste targets and the source object based on the attributes of the source object and the attributes of the editable component further comprises:

determining the matching relationship between each of the lower-level candidate paste targets and the source object based on the attributes of the source object and the attributes of the editable component; and determining the matching relationship between the high-level candidate paste target and the source object based on the matching relationships between the lower-level candidate targets and the source object.

6. The computer-implemented method according to claim 5, wherein providing the recommendation for pasting the source object based on the matching relationship further comprises: in response to a user' selection of the high-level candidate paste target, providing the recommendation based on the matching relationships of the lower-level candidate paste targets included in the high-level candidate paste target.

7. The computer-implemented method according to claim 1, wherein part of the plurality of source objects are obtained through a clipboard, and the order of the plurality of source objects is adjustable.

8. The computer-implemented method according to claim 1, wherein the attributes of the candidate paste target further comprise an overall attribute of the candidate paste target, the method further comprising:

adjusting the matching relationship between the candidate paste target and the source object based on the overall attribute.

9. A data pasting apparatus, comprising:

a processor configured to execute a plurality of modules comprising:

a first attribute determining module configured to determine attributes of a source object that is data to be pasted;

a second attribute determining module configured to obtain attributes of each candidate paste target among a plurality of candidate paste targets, the attributes of the candidate paste targets at least comprising attributes of an editable component;

a matching relationship determining module configured to determine a matching relationship between each of the candidate paste targets and the source object based on the attributes of the source object and the attributes of the editable component, wherein the matching relationship comprises a hierarchy having a higher-level candidate paste target and a lower-level candidate paste target; and a recommendation module configured to provide recommendation for pasting the source object based on the matching relationship, wherein the matching relationship determining module further comprises: a module configured to determine a first vector based on the attributes of the source object, to determine a second vector based on the attributes of the editable component, and to determine the matching relationship based on at least one of a similarity between the first vector and the second vector and a distance between the first vector and the second vector, wherein the similarity is determined using cosine similarity and wherein the distance is determined using a Euclidean distance.

10. The apparatus according to claim 9, wherein the matching relationship determining module further comprises a module configured to make statistics on a number of matching between the attributes of the editable component and the attributes of the source object, and to determine the matching relationship based on the number of the matching.

11. The apparatus according to claim 9, wherein at least one of the plurality of candidate paste targets is a high-level candidate paste target further comprises lower-level candidate paste targets, and the editable component is located in the lower-level candidate paste targets.

12. The apparatus according to claim 11, wherein the matching relationship determining module further comprises:

a module configured to determine the matching relationship between each of the lower-level candidate paste targets and the source object based on the attributes of the source object and the attributes of the editable component; and a module configured to determine the matching relationship between the high-level candidate paste target and the source object based on the matching relationships between the lower-level candidate targets and the source object.

13. The apparatus according to claim 12, wherein the recommendation module further comprises: a module configured to, in response to a user's selection of the high-level candidate paste target, provides the recommendation based on the matching relationships of the lower-level paste targets included in the high-level candidate paste target.

14. The apparatus according to claim 9, wherein a plurality of the source objects are obtained through a clipboard, and the order of the plurality of source objects is adjustable.

15. The apparatus according to claim 9, wherein the attributes of the candidate paste target further comprise an overall attribute of the candidate paste target, the apparatus further comprising:

a module configured to adjust the matching relationship between the candidate paste target and the source object based on the overall attribute.

\* \* \* \* \*